(12) United States Patent
Venkataramani et al.

(10) Patent No.: US 9,947,362 B1
(45) Date of Patent: Apr. 17, 2018

(54) ASYNCHRONOUS INTERFERENCE CANCELLATION

(71) Applicant: Seagate Technology LLC, Cupertino, CA (US)

(72) Inventors: Raman Venkataramani, Longmont, CO (US); Belkacem Derras, Longmont, CO (US); William Michael Radich, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/193,050

(22) Filed: Jun. 25, 2016

(51) Int. Cl.
*G11B 5/09* (2006.01)
*G11B 20/10* (2006.01)
*G06F 17/17* (2006.01)

(52) U.S. Cl.
CPC ........ *G11B 20/10212* (2013.01); *G06F 17/17* (2013.01)

(58) Field of Classification Search
None
See application file for complete search history.

(56) References Cited

U.S. PATENT DOCUMENTS

| | | | | |
|---|---|---|---|---|
| 4,460,890 A | * | 7/1984 | Busby | H04B 1/66 341/61 |
| 4,866,647 A | * | 9/1989 | Farrow | G06F 17/17 708/313 |
| 5,490,018 A | * | 2/1996 | Yamashita | G11B 20/00 360/32 |
| 5,986,990 A | * | 11/1999 | Moon | G11B 20/10009 369/124.05 |
| 9,093,115 B1 | | 7/2015 | Fung | |
| 2009/0195906 A1 | * | 8/2009 | Feller | G11B 5/59616 360/65 |
| 2012/0066561 A1 | * | 3/2012 | Feller | G11B 20/10009 714/746 |
| 2012/0105994 A1 | | 5/2012 | Bellorado | |

* cited by examiner

*Primary Examiner* — Peter Vincent Agustin
(74) *Attorney, Agent, or Firm* — Cesari & Reed, LLP; Kirk A. Cesari; Logan Brown (57) ABSTRACT

A system may include an interpolator circuit configured to receive a first signal with a first rate and to generate an interpolated signal with a second rate. The system may include a cancellation circuit configured to determine an interference component signal based on the interpolated signal. The system may further comprise an adder configured to receive a second signal with the second rate and to cancel interference in the second signal using the interference component signal to generate a cleaned signal.

20 Claims, 8 Drawing Sheets

ASYNCHRONOUS INTERFERENCE CANCELLATION

SUMMARY

In certain embodiments, an apparatus may comprise a circuit configured to receive a first signal with a first rate. The circuit may interpolate the first signal to generate an interpolated signal with a second rate. Further, the circuit may determine an interference component signal based on the interpolated signal. The circuit may also cancel interference in a second signal using the interference component signal to generate a cleaned signal.

In certain embodiments, a system may comprise an interpolator circuit configured to receive a first signal with a first rate and to generate an interpolated signal with a second rate. The system may include a cancellation circuit configured to determine an interference component signal based on the interpolated signal. The system may further comprise an adder configured to receive a second signal with the second rate and to cancel interference in the second signal using the interference component signal to generate a cleaned signal.

In certain embodiments, a method may comprise receiving a first signal with a first rate. The method may comprise interpolating the first signal to generate an interpolated signal with a second rate. The method may further comprise one of determining a first interference component signal based on the interpolated signal and canceling interference in a second signal using the first interference component signal to generate a first cleaned signal or determining a second interference component signal based on the second signal and canceling interference in the interpolated signal using the second interference component signal to generate a second cleaned signal.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software or firmware programs running on a computer processor or controller. In accordance with another embodiment, the methods and functions described herein may be implemented as one or more software or firmware programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

The present disclosure generally relates to cancellation of interference between signals, and more specifically, the present disclosure relates to interference between signals with different bit rates. Some systems, such as electrical, electronic, motor drive, processing, or other systems may receive a signal of interest that include interference from another signal with a bit rate that is different from the signal of interest. The received signal of interest and the signal that is the source of the interference can be processed to produce a cleaned signal that can be provided to a detector for detection of bit values of a bit sequence.

For example, the signal that is the source of the interference may be interpolated to generate an interpolated signal with the bit rate of the signal of interest. The interpolated signal may be used to approximate the portion of the signal of interest which is the result of the interference. The approximated portion may then be removed from the signal of interest to generate a cleaned signal.

Figure 1:
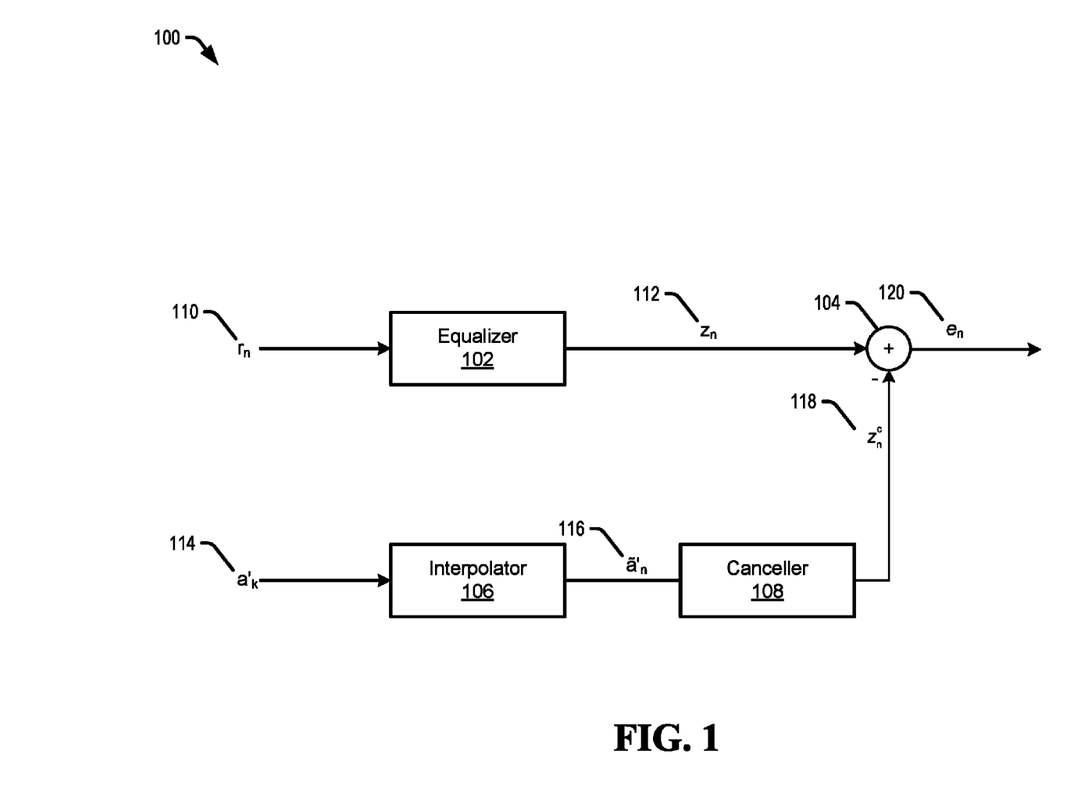
FIG. 1 is a block diagram of a system of asynchronous interference cancellation, in accordance with certain embodiments of the present disclosure.

Referring to FIG. 1, a block diagram of a system of asynchronous interference cancellation is shown and is generally designated 100. The system 100 can be configured to produce a cleaned signal by canceling interference in a signal of interest that results from another signal that is asynchronous with the signal of interest. It can include an equalizer 102 that is coupled to an adder 104 and an interpolator 106 that is coupled to a canceller 108 which is in turn coupled to the adder 104.

The equalizer 102 may receive a signal of interest 110 ($r_n$) from which interference is to be cancelled. The equalizer 102 may generate an equalized signal 112 ($z_n$) based on the signal 110.

The interpolator 104 may receive an adjacent signal 114 ($a'_k$) which can be, for various reasons, the source of the interference in the signal 110. The underlying data in the signal 110 and adjacent signal 114 may both be bit sequences. The adjacent signal 114 may have a different bit rate from the signal 110. The interpolator 106 may interpolate the adjacent signal 114 to generate an interpolated signal 116 ($\tilde{a}'_n$) which may be an approximation of a resampled version of the bit sequence of the adjacent signal at the bit rate of the signal 110.

The canceller 108 may receive the interpolated signal 116 and generate an interference component signal 118 ($z_n^c$)

which may be an estimate of the interference from the adjacent signal 114 that is present in the signal 110.

The adder 104 may receive the equalized signal 112 and the interference component signal 118. The adder 104 may combine the equalized signal 112 and the interference component signal 118 (e.g. subtract the interference component signal 118 from the equalized signal 112) such that the estimated interference is removed from the equalized signal 112. In this way, the adder 104 may generate the cleaned signal 120 ($e_n$).

Each of the equalizer 102, adder 104, interpolator 106 and canceller 108 may be a separate circuit, a system on chip (SOC), firmware, a processor(s), or other system not listed, or any combination thereof.

The following discussion provides an example of the operation of the interpolator 104 and the canceller 108. In this and the following examples, primed variables to denote quantities related to the adjacent signal which may be the signal that is, for various reasons, causing the interference in the signal of interest. Further, variables with a tilde above may represent signals or parameters that are the result of an interpolation. In addition, variable subscripts may be indicative of the bit rate of the signal represented by the variable.

In the following example, which may be used in magnetic recording, the bits of the signal 110 may have a width of T and the bits of the adjacent signal 114 may have a width T'. In such a case, the channel bit density of the signal 110 may be CBD=/$P_{50}$/T and the channel bit density of the adjacent signal 114 may be CBD'=$P_{50}$/T' where $P_{50}$ is the "half peak width" of reader impulse response. As such, $$\eta = CBD'/CBD = T/T' \qquad (1)$$

where $\eta$ denotes the ratio of channel bit densities. Where both signals occupy the same period or space and the number of bits in the signals is N and N' respectively, N'=$\eta$N.

Continuing the example, $\{a_n: 0 \le n < N\}$ and $\{a'_k: 0 \le k < N'\}$ may denote the underlying data bits of the signal 110 and of the adjacent signal 114, respectively. The samples of the signal 110 may be samples of a continuous-time readback signal at t=nT, e.g., $r_n$=r(nT), where $$r(t) = r_o(t) + \alpha r'_o(t) + w(t) \qquad (2)$$

$$r_o(t) = \sum_n (a_n - a_{n-1}) h(t - nT + \delta_n) \qquad (3)$$

$$r'_o(t) = \sum_k (a'_k - a'_{k-1}) h(t - kT' + \delta'_k) \qquad (4)$$

where $r_o(t)$ is the desired signal component contained in the signal 110, $r'_o(t)$ is interference from the adjacent signal 114 scaled by an interference amplitude $\alpha$ and w(t) is additive electronics noise. Also, h(•) may be the transition response, $\delta_n$ and $\delta'_k$ are the transition jitter noise samples associated with the desired signal 110 and the adjacent signal 114 respectively, which may be modeled as zero-mean Gaussian sequences. The asynchronous interference cancellation may cancel the term $\alpha r'_o(t)$ from (2) in its samples taken at t=nT.

Equation (4) may be written using the first order Taylor series approximation, as $$r'_o(nT) \simeq \sum_k (a'_k - a'_{k-1}) \left( h(nT - kT') + \delta'_k \frac{dh(nT - kT')}{dt} \right) \qquad (5)$$

-continued $$= \sum_k a'_k h_D(nT - kT') + \sum_k (a'_k - a'_{k-1}) \delta'_k h_I(nT - kT')$$

where $$h_D(t) = h(t) - h(t-T') \qquad (6)$$

is the "dibit" response with respect to the adjacent signal 114, and $$h_I(t) = \frac{dh(t)}{dt} \qquad (7)$$

is the impulse response of the system represented in 100.

The second summation term in (5) may be a data-dependent noise sequence as it contains a product of the transition sequence $a'_k - a'_{k-1}$ and the zero-mean jitter noise $\delta'_k$. As such, its conditional mean, given the adjacent signal 114 bit sequence $\{a'_k\}$, is zero. Thus, this term may be uncorrelated with the adjacent signal 114 bits and may be treated as an additional noise source in the signal 110.

The first summation term in (5), due to the presence of two different time factors T and T', may not be a simple convolution of the adjacent signal 114 bits with the dibit response. This may be recast as a simple convolution, or a filtering operation, by using a mild assumption on the bandwidth of the dibit response $h_D$ (t), or equivalently the step response h(t).

As mentioned above, both h(t) and $h_D$(t) may have a natural bandwidth of roughly 1/(2$P_{50}$), where $P_{50}$ is a measure of its pulse-width in the time domain. Where CBD>1 or T<$P_{50}$, h(t) may be band-limited to the frequencies [− ½T,½T]. Furthermore, the spectrum H(f) may taper off quickly reaching nearly zero at f=±1/(2T).

The bandlimited signals may be representable by their samples at the Nyquist rate and the signal may be reconstructed through interpolation as follows:

$$h_D(t) = \sum_m h_D(mT) \text{sinc}(t/t - m), \qquad (8)$$

where $\text{sinc}(t) \stackrel{def}{=} \sin(\pi t)/(\pi t)$. More generally, $h_D(t)$ may be expressed as $$h_D(t) = \sum_m C_m \phi(t/T - m), \qquad (9)$$

where $\phi$(t) is the interpolation function whose Fourier transform $\Phi$(f) is nonzero for f$\in$[−½,½] and zero otherwise. The coefficients $C_m$ may constitute the "basis representation" of $h_D$(t) with respect to the basis $\{\phi(t-m): m\in\mathbb{Z}\}$. The coefficients $C_m$ may be computed explicitly as projections onto the biorthogonal basis $\{\tilde\phi(t-m): m\in\mathbb{Z}\}$, e.g., $$C_m = \int h_D(t) \tilde\phi(t-m) dt, \qquad (10)$$

where $\tilde\phi$(t) is the biorthogonal basis function whose Fourier transform is $$\tilde\phi(f) = \begin{cases} 1/\phi(f) & \text{if } |f| < 1/2 \\ 0 & \text{otherwise} \end{cases}$$

Equation (8) may be a special case of (9) with $$\phi(f) = \begin{cases} 1 & \text{if } |f| < 1/2 \\ 0 & \text{otherwise} \end{cases} \quad (11)$$

being the Fourier transform of sinc(t). As such, $\phi(t) = \tilde{\phi}(t) = \text{sinc}(t)$ and $C_m = h_D(mT)$.

When $t = nT - kT'$ in (9), equation (1) gives:

$$h_D(nT - kT') = h_D((n - k/\eta)T) = \sum_m C_m \phi(n - k/\eta - m). \quad$$

Therefore, the first summation term in (5) becomes:

$$\sum_k a'_k h_D(nT - kT') = \sum_k a'_k \sum_m C_m \phi(n - k/\eta - m) \quad (12)$$
$$= \sum_m C_m \sum_k a'_k \phi(n - k/\eta - m)$$
$$= \sum_m C_m S_{a'}(n - m),$$

which has a claimed form of a convolution (e.g. filtering) of the dibit response and the samples of a new signal $S_{a'}(t)$ defined as:

$$S_{a'}(t) \stackrel{\text{def}}{=} \sum_k a'_k \phi(t - k/\eta). \quad (13)$$

Its samples taken at $t = nT$, henceforth denoted by $\tilde{a}'_n = S_{a'}(n)$, may be an approximation of a resampled version of the adjacent signal 114 bit sequence at the bit rate of the signal 110. In general, if $T \neq T'$, $\tilde{a}'_n$ (116) may produce a sequence of real values rather than the binary values ±1.

In (12), $C_m$ may be regarded as a (cancellation) filter that is applied to the interpolated bit sequence. Given that $z_n$ and $\tilde{a}'_n$ have synchronized bit rates, canceller 108 may perform a linear filtering based cancellation. This may be done by estimating the finite impulse response (FIR) cancellation filter of length 2M+1:

$$C(z) = \sum_{m=-M}^{M} C_m z^{-m} \quad (14)$$

and applying C(z) to the adjacent signal 114 bits. The result of applying C(z) to the adjacent signal 114 bits may be subtracted from the equalized signal 112 samples so that the variance of the interference-free or "cleaned" equalized signal is minimized. This may be represented as:

$$z_n^c = \sum_{m=-M}^{M} C_m \tilde{a}'_{n-m} \quad (15)$$

$$e_n = z_n - z_n^c \quad (16)$$

The non-adaptive Wiener solution may be obtained by solving the following equations:

$$0 = E(e_n \tilde{a}'_{n-m}) = E\left(\tilde{a}'_{n-m}\left(z_n - \sum_{k=-M}^{M} C_k \tilde{a}'_{n-k}\right)\right)$$

for $C_k$ with $-M \leq m, k \leq M$. The cancellation filter $C = [C_{-M}, \ldots, C_M]^T$ may be computed as follows $$C = R^{-1} p \quad (17)$$

where the matrix R is the autocorrelation matrix of $\tilde{a}'_n$, and p is the cross-correlation vector with the following definitions:

$$R_{ij} = E(\tilde{a}'_{n-i} \tilde{a}'_{n-j})$$

$$p_j = E(z_n \tilde{a}'_{n-j})$$

for $-M \leq i, j \leq M$.

Figure 2:
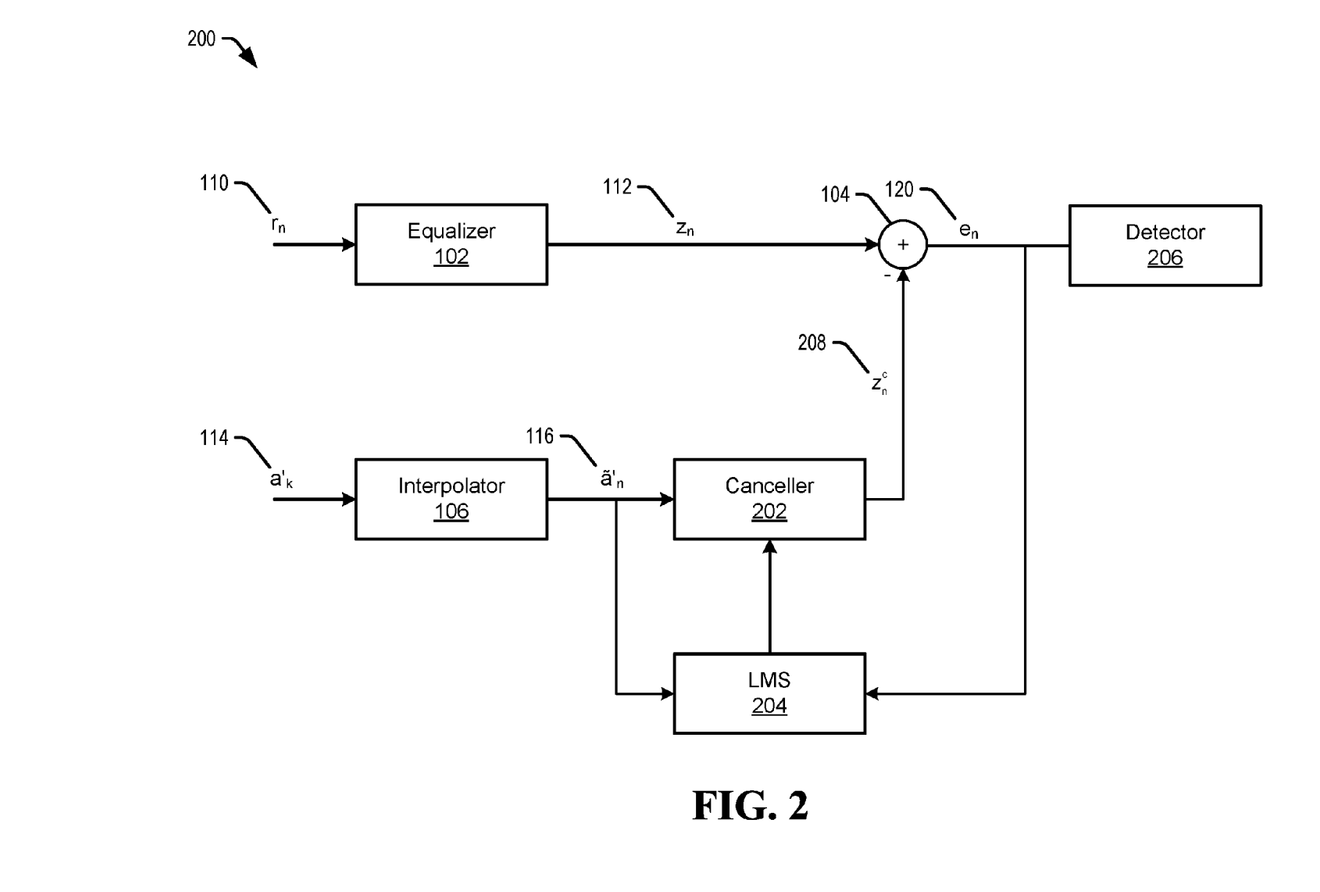
FIG. 2 is a block diagram of a system of asynchronous interference cancellation, in accordance with certain embodiments of the present disclosure.
Figure 3:
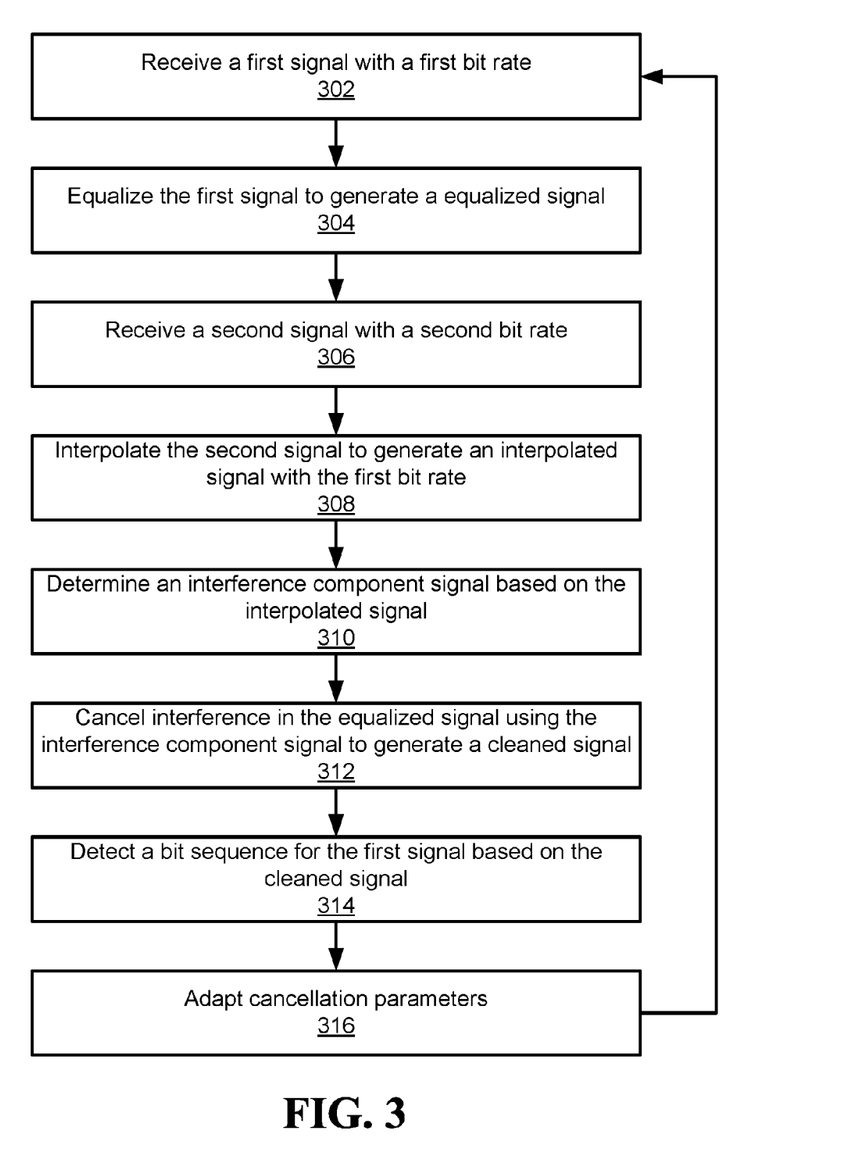
FIG. 3 is a flowchart of a method asynchronous interference cancellation, in accordance with certain embodiments of the present disclosure.

While discussed and shown as the Wiener solution, the cancellation filter taps may be computed using an adaptive algorithm, as described with regard to FIGS. 2 and 3, rather than as in (17).

Referring to FIG. 2, a block diagram of a system of asynchronous interference cancellation is shown and is generally designated 200. In the embodiment of system 200, the canceller may implement an adaptive algorithm. The operations of the equalizer 102, the adder 104 and the interpolator 106 with respect to signals 110, 112, 114 and 116 may be the same as in FIG. 1. System 200 can include the canceller 202 and the LMS 204, which operate to conduct adaptive cancellation on the interpolated signal 116. System 200 can further include the detector 206 which can operate to determine bit values of a bit sequence from the samples of the cleaned signal 120.

As illustrated, the LMS 204 may operate to adaptively update the cancellation performed by the canceller 202 based on the interpolated signal 116 and the cleaned signal 120.

Using the updated cancellation filtering parameters supplied by the LMS 204, the canceller 202 may receive the interpolated signal 116 and generate an interference component signal 208 ($z_n^c$) which may be an estimate of the interference from the adjacent signal 114 that is present in the signal 110.

The adder 104, as discussed with regard to FIG. 1, may combine the equalized signal 112 with the interference component signal 208 to generate the cleaned signal 120.

The detector 206 may operate to determine the bit sequence represented by the samples of the cleaned signal 120.

Each of the canceller 202, LMS 204 and detector 206 may be a separate circuit, a system on chip (SOC), firmware, a processor(s), or other system not listed, or any combination thereof.

In certain embodiments, the canceller 202 and LMS 204 may apply adaptive linear cancellation to the interpolated bit sequence defined in (13). The update equation may be represented as:

$$\tilde{a}'_m \stackrel{\text{def}}{=} S_{a'}(m) = \sum_k a'_k \phi(m - k/\eta) \quad (18)$$

Using the adaptive algorithm, various interpolation functions φ(t) may be used. Different functions may produce different sequences $\tilde{a}'_k$. Because the cancellation filter tunes itself to any choice of interpolation function (t), the interference estimate may remain nearly the same. To cancel the interference in the equalized signal, the following equations may be used:

$$z_n^c = \sum_{m=-M}^{M} C_m \tilde{a}'_{n-m} \quad (19)$$

$$e_n = z_n - z_n^c \quad (20)$$

The cancellation filter may be chosen adaptively to minimize the cost function:

$$J = \sum^n e_n^2,$$

where the cancellation filter is updated as follows $$C_m \leftarrow C_m + \mu e_n \tilde{a}'_{n-m} \quad (21)$$

In the examples of FIGS. 1 and 2, the equalized signal $z_n$ may be cleaned after equalization. However, in some embodiments, the signal 110 may be cleaned prior to equalization.

Referring to FIG. 3, a flowchart of a method of asynchronous interference cancellation is shown and is generally designated 300. The method 300 can be an embodiment of the system 200. The order in which the operations are described is not intended to be construed as a limitation, and any number of the described operations can be combined in any order and/or in parallel to implement the process.

The system may receive a first signal with a first bit rate, at 302. The first signal may be equalized to generate an equalized signal, at 304. The system may receive a second signal with a second bit rate, at 306. The second signal may be interpolated at 308 to generate an interpolated signal with the first bit rate. At 310, the system may determine an interference component signal based on the interpolated signal. The system may then cancel the interference in the equalized signal using the interference component signal to generate a cleaned signal, at 312. A bit sequence for the first signal may be detected based on the cleaned signal, at 314. At 316, the system may adapt cancellation parameters based on the interpolated signal and the cleaned signal.

The process may repeat at 302. Additionally or alternatively, after block 312, blocks 306-314 may be repeated using the cleaned signal as the equalized signal and another adjacent signal as the second signal, for example, until all adjacent signals contributing interference to the signal 110 have been accounted for. This and other variations would be apparent to one of ordinary skill in the art in view of this specification.

All steps listed for the method 300 may be applied to communication systems that have adjacent signals or a second signal that allows for the error signal herein to be calculated. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 4:
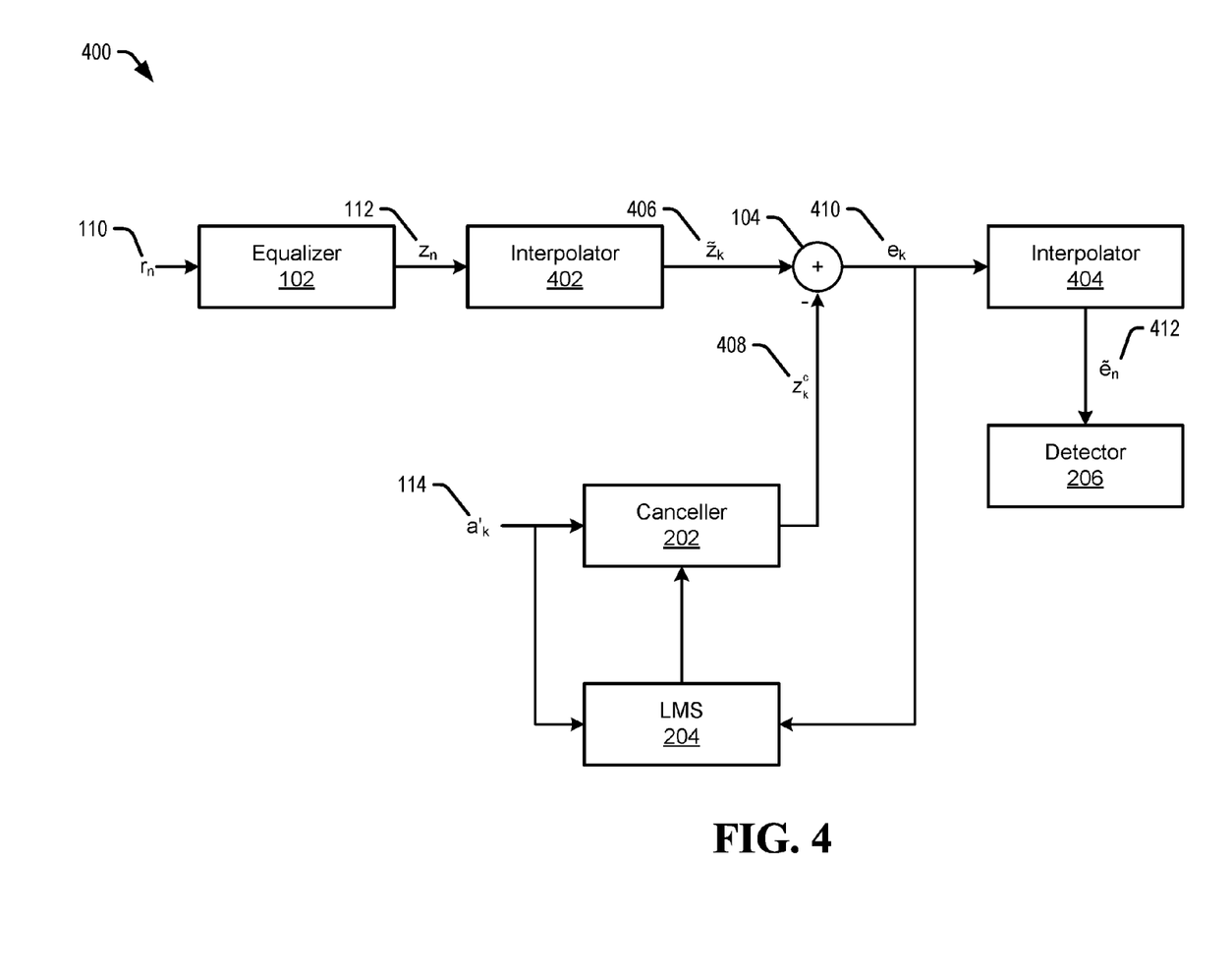
FIG. 4 is a block diagram of a system of asynchronous interference cancellation, in accordance with certain embodiments of the present disclosure.

Referring to FIG. 4, a block diagram of a system of asynchronous interference cancellation is shown and is generally designated 400. In the embodiment of system 400, the system 400 may interpolate the equalized signal 112 to the bit rate of the adjacent signal 114. After performing the cancellation, the cleaned signal, which has the bit rate of the adjacent signal 114, may be interpolated again to the bit rate of the signal 110. For example, the system 400 may include interpolators 402 and 404 to perform this function. Except to the extent discussed below, the operations of the equalizer 102, the adder 104, the canceller 202, the LMS 204, and the detector 206 may be same as described above in FIGS. 1 and 2.

In operation, after the equalized signal 112 is generated, the interpolator 402 may perform an interpolation operation to generate an interpolated signal 406 ($\tilde{z}_k$). The interpolation of the equalized signal 112 from the bit rate of the signal 110 to the bit rate of the adjacent signal 114 may be the same or similar to the interpolation of the adjacent signal 114 into the interpolated signal 116 described above with regard to FIGS. 1 and 2.

The canceller 202 and the LMS 204 can operate to determine the interference component signal 408 ($z_k^c$) based on the adjacent signal 114 instead of the interpolated signal 116. As such, the interference component signal 408 may be at the bit rate of the adjacent signal 114 and the interpolated signal 406, not the signal 110.

The adder 104, as discussed with regard to FIG. 1, may combine the interpolated signal 406 with the interference component signal 408 to generate the cleaned signal 410 ($e_k$).

The interpolator 404 may perform an interpolation operation on the cleaned signal 410 to generate an interpolated cleaned signal 412 ($\tilde{e}_n$) with the same bit rate as signals 110 and 112. The interpolation of the cleaned signal 410 from the bit rate of the adjacent signal 114 to the bit rate of the signal 110 may be similar to the interpolation of the adjacent signal 114 into the interpolated signal 116 described above with regard to FIGS. 1 and 2.

The detector 206 may operate to determine a bit sequence represented by the samples of the bit sequence in the interpolated cleaned signal 412.

Given the samples of signal 110, specifically r(t) in (2), at t=nT (bit rate of the signal 110), the underlying continuous-time signal r(t) may be obtained by the Shannon sampling theorem $$r(t) = \sum_n r_n \mathrm{sinc}(t/T - n)$$

The following is an example embodiment according to FIG. 4. In particular, the system approximates a resampling of r(t) at t=lT' as follows:

$$r(lT') = \sum_n r_n \mathrm{sinc}(lT'/T - n) = \sum_n r_n \mathrm{sinc}(l/\eta - n). \quad (22)$$

Equation (22) may be implemented using a digital filter, rather than going through the continuous-time domain. The interference component of this signal at t=lT' may be $$r'_o(lT') \simeq \sum_k (a'_k - a'_{k-1})\left(h(lT' - kT') + \delta'_k \frac{dh(lT' - kT')}{dt}\right) \quad (23)$$

$$= \sum_k a'_k h_D(lT' - kT') + \sum_k (a'_k - a'_{k-1})\delta'_k h_I(lT' - kT')$$

In the resampled domain, the first term of (23) may be a convolution of $h_D(kT')$ and $a'_k$. The adaptive interference canceller described above may be directly applied to $a'_k$ and the resampled readback samples $r_o'(lT')$ to clean it up. The cleaned signal 410 samples, denoted by $e_k$, may be at the bit rate of the adjacent signal rather than the bit rate of the signal 110. As such, the system may interpolate and resample the cleaned signal 410 sequence as follows:

$$e(t) \overset{def}{=} \sum_k e_k sinc(t/T' - k) \quad (24)$$

$$\tilde{e}_n = e(nT) = \sum_k sinc(\eta n - k)$$

Again, equation (24) may be implemented as a digital filter without passing through the continuous-time domain. The interpolated cleaned signal ($\tilde{e}_n$) may be at the bit rate of the signal 110 and may be sent to the detector.

Figure 5:
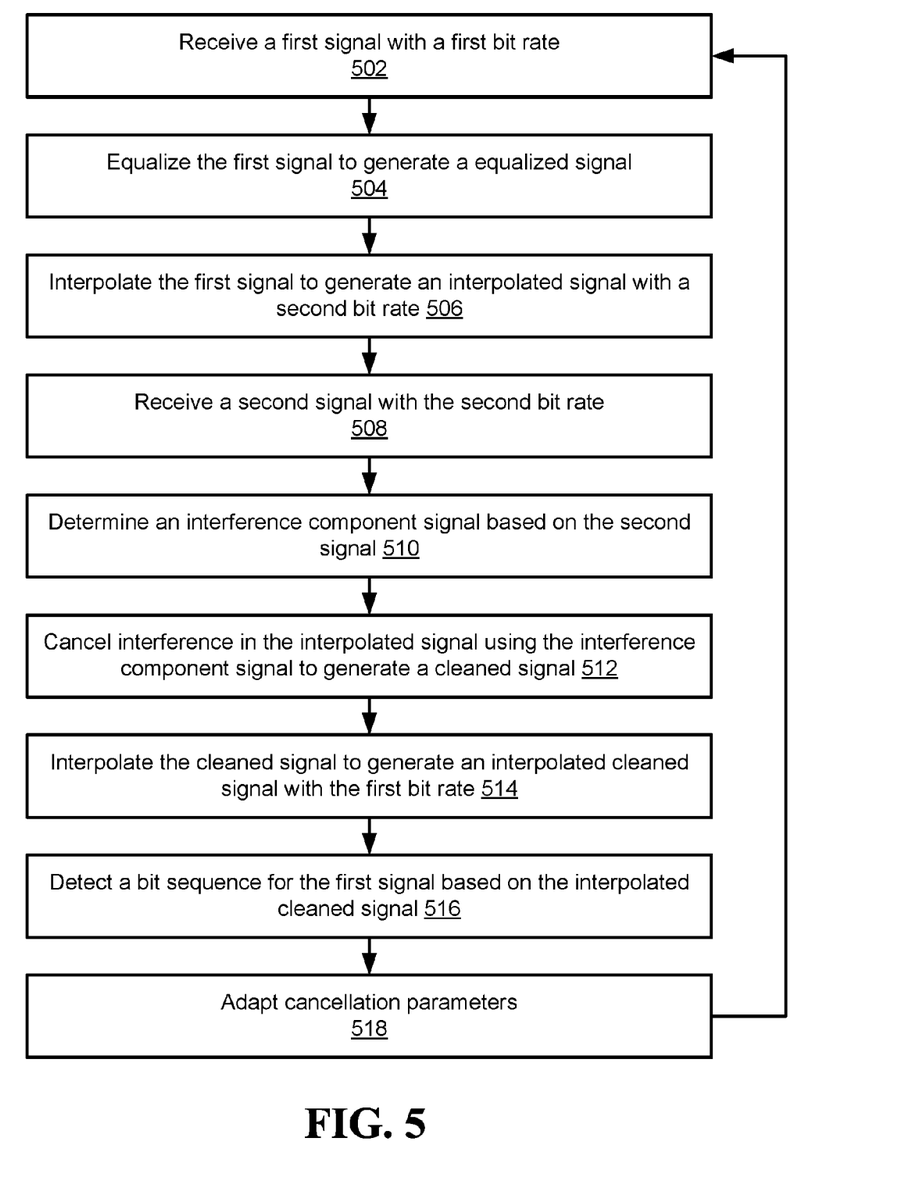
FIG. 5 is a flowchart of a method asynchronous interference cancellation, in accordance with certain embodiments of the present disclosure.

Referring to FIG. 5, a flowchart of a method asynchronous interference cancellation is shown and is generally designated 500. The method 500 can be an embodiment of the system 400. The order in which the operations are described is not intended to be construed as a limitation, and any number of the described operations can be combined in any order and/or in parallel to implement the process.

The system may receive a first signal with a first bit rate, at 502. The first signal may be equalized to generate an equalized signal, at 504. At 506, the system may interpolate the first signal to generate an interpolated signal with a second bit rate. The system may receive a second signal with a second bit rate, at 508. At 510, the system may determine an interference component signal based on the interpolated signal. The system may then cancel the interference in the interpolated signal using the interference component signal to generate a cleaned signal, at 512. The cleaned signal may be reinterpolated at 514 to generate a cleaned interpolated signal with the first bit rate of the signal 110. A bit sequence for the first signal may be detected based on the interpolated cleaned signal, at 314. At 518, the system may adapt cancellation parameters based on the adjacent signal and the cleaned signal.

The process may repeat at 502. Additionally or alternatively, after block 512, blocks 508-512 may be repeated using the cleaned signal as the interpolated signal and another adjacent signal as the second signal, for example, until all adjacent signals contributing interference to the signal 110 have been accounted for. In another example variation, the operations of block 518 may be performed after block 512 and before block 514. This and other variations would be apparent to one of ordinary skill in the art in view of this specification.

All steps listed for the method 500 may be applied to communication systems that have adjacent signals or a second signal that allows for the error signals herein to be calculated. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 6:
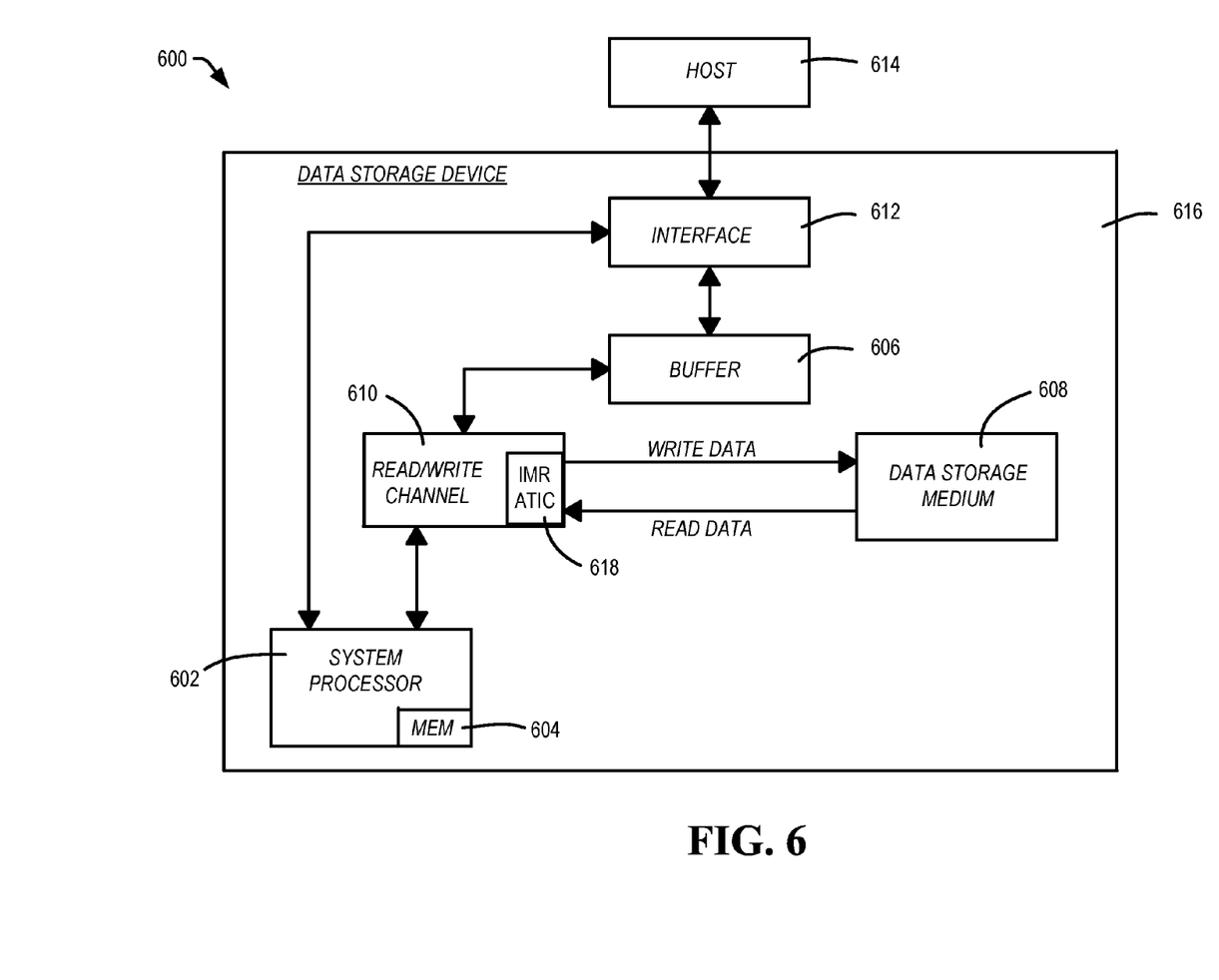
FIG. 6 is a block diagram of a system of asynchronous adjacent track interference cancellation, in accordance with certain embodiments of the present disclosure.
Figure 7:
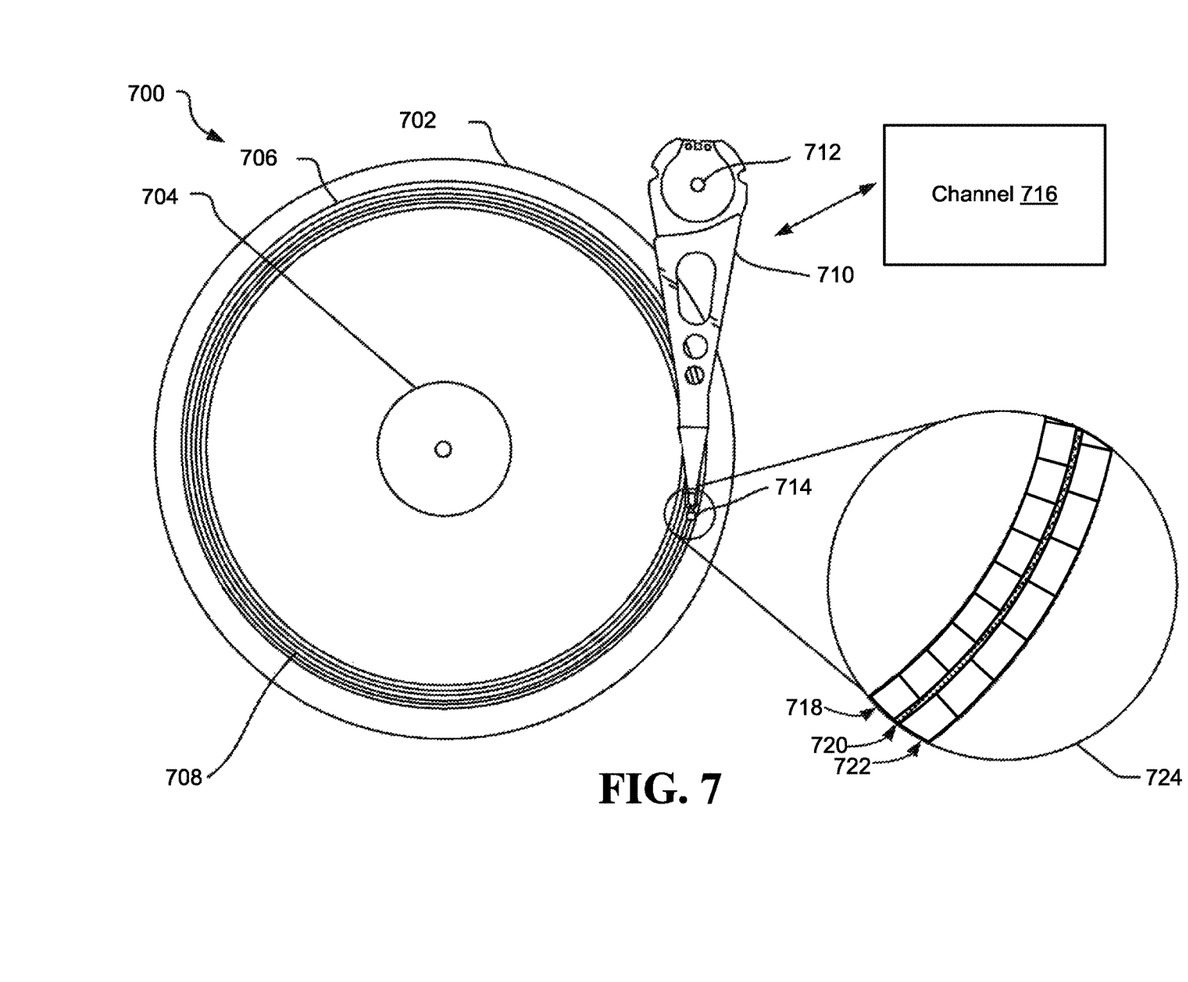
FIG. 7 is a block diagram of a system of asynchronous adjacent track interference cancellation, in accordance with certain embodiments of the present disclosure.
Figure 8:
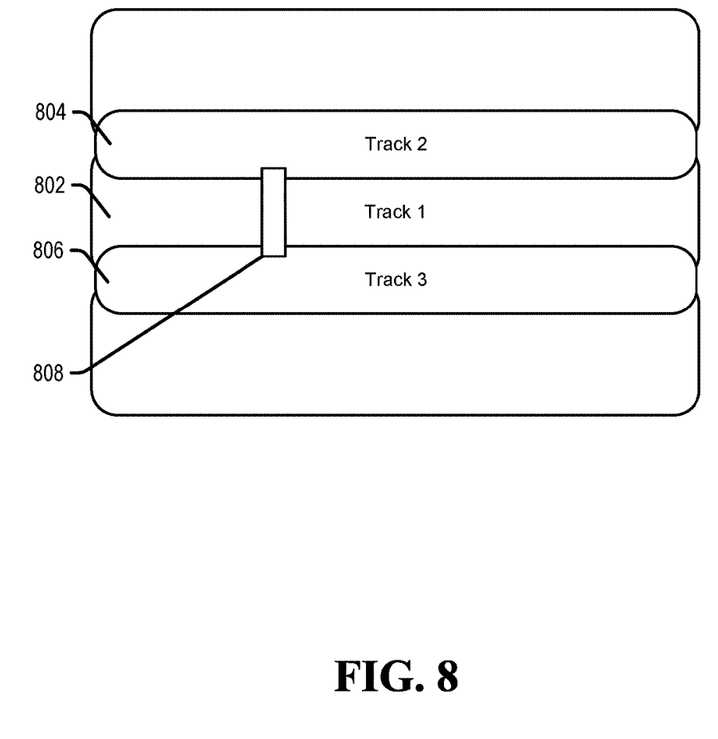
FIG. 8 is a diagram illustrating asynchronous adjacent track interference cancellation, in accordance with certain embodiments of the present disclosure.

FIGS. 6-8 illustrate example environments in which asynchronous interference cancellation may be implemented. In particular, FIGS. 6-8 illustrate an interleaved magnetic recording (IMR) hard drive system with different channel bit densities (CBD) between tracks. In IMR, tracks may be written in two passes using two kinds of writers or writer settings whose primary distinction is the writer width. In the first pass, a wide writer or write setting may be used to write tracks, which can be assumed to be even-numbered. These tracks may be written at a high CBD, for example, because the wide writer or write setting produces low transition jitter noise. In the second pass, a narrow writer or write setting may be used to write the odd-numbered tracks in such a way that the odd-numbered tracks may overlap with (e.g. overwrites) the edges of even-numbered tracks as illustrated and discussed with regard to FIGS. 7 and 8. This may result in all tracks being narrow and the even tracks exhibiting low transition noise. Thus, a high average track density and CBD may be achieved.

By packing tracks close to one another, interference from adjacent tracks may arise. For example, interference can arise because the reader response may be wider than the written track due to manufacturing constraints. In addition, an even track can be written so that it encroaches on the odd track by slightly overlapping the first track (the area of the first track). If the overlap is significant enough, corrupted data value(s) may be created on the first track and the data value previously written onto the first track may no longer be discernible without interference cancellation.

The asynchronous interference cancellation techniques described above with regard to FIGS. 1-5 may alleviate the interference even though the bits on the track of interest (or main track) and adjacent tracks may not be synchronized due to the unequal data rates of the tracks.

Referring to FIG. 6, a block diagram of a system of asynchronous interference cancellation is shown and generally designated 600. The system 600 can be an example of a data storage device (DSD), and may be an example implementation of systems 100, 200 or 400. The DSD 616 can optionally connect to and be removable from a host device 614, which can be a device or system having stored data, such as a desktop computer, a laptop computer, a server, a digital video recorder, a photocopier, a telephone, a music player, other electronic devices or systems not listed, or any combination thereof. The data storage device 616 can communicate with the host device 614 via the hardware/firmware based host interface circuit 612 that may include a connector (not shown) that allows the DSD 616 to be physically connected and disconnected from the host 614.

The DSD 616 can include a system processor 602, which may be a programmable controller, and associated memory 604. The system processor 602 may be part of a system on chip (SOC). A buffer 606 may temporarily store data during read and write operations and can include a command queue. The read/write (R/W) channel 610 can encode data during write operations to, and reconstruct data during read operations from, the data storage medium 608. The data storage medium 608 is shown and described as a hard disc drive, but may be other types of medium, such as a flash medium, optical medium, or other medium, or any combination thereof.

The R/W channel 610 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 610 can combine multiple inputs and provide a single output, as described in examples herein.

The IMR ATIC 618 (interleaved magnetic recording asynchronous track interference canceller) can implement all of or at least part of the systems and functionality of systems 100, 200, and 400. In some embodiments, the IMR ATIC 618 may be a separate circuit, integrated into the R/W channel 610, included in a system on chip, firmware, software, or any combination thereof.

Referring to FIG. 7, a block diagram of a system of asynchronous interference cancellation in the context of a hard disc drive system is shown and generally designated 700. A disc 702 includes an inner diameter 704 and an outer diameter 706 between which are a number of concentric data tracks 708, illustrated by circular dashed lines.

Information may be written to and read from the data tracks 110 on the disc 702. A transducer head 714 may be mounted on an actuator assembly 710 at an end distal to an actuator axis of rotation 712. The transducer head 714 may fly in above the surface of the disc 702 during disc operation. The actuator assembly 710 may rotate during a seek operation about the actuator axis of rotation 712 positioned adjacent to the disc 702. The seek operation may position the transducer head 714 over a target data track of the data tracks 714.

The exploded view 724 illustrates two overlapping tracks. A first track 718 is shown with a first channel bit density. A second track 722 is shown with a second channel bit density. The region 720 shows an area where the two tracks may be overlapped in some examples.

Channel 716 can include circuits and other elements that can be utilized to cancel interference from adjacent tracks. As mentioned above, variance in the region of overlap 720 may lead to asynchronous adjacent track interference. Thus, channel 716 may implement the systems and functions described herein to compensate for asynchronous adjacent track interference.

FIG. 8 illustrates another potential source of asynchronous adjacent track interference. In particular, interference can arise when the cross-track reader response is wider than the track being read. In FIG. 8, track 1 802 and the other wide tracks may be written first. The narrow tracks, including track 2 804 and track 3 806, may then be written over the edges of the wide tracks. In the illustrated example, the read head 808 can have a read response that is wider than the tracks 802-806. As such, when reading track 1, the read head 808 may pick up interference from track 2 804 and track 3 806. The channel 716 may operate to cancel the interference from track 2 804 and track 3 806 in the manner described above regarding FIGS. 1-5.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
  a circuit configured to:
    receive a first signal with a first rate;
    interpolate the first signal to generate an interpolated signal with a second rate;
    determine an interference component signal based on the interpolated signal; and
    cancel interference in a second signal using the interference component signal to generate a cleaned signal;
    the second signal corresponding to a first source with a first channel bit density; and
    the first signal corresponding to a second source with a second channel bit density.

2. The apparatus of claim 1, the circuit further configured to:
  receive a third signal with the second rate; and
  equalize the third signal to generate the second signal.

3. The apparatus of claim 1, further comprising a detector circuit to generate a bit sequence based on the cleaned signal.

4. The apparatus of claim 1, further comprising the circuit comprising a cancellation circuit configured to cancel the interference in the second signal based on parameters;
  the circuit further configured to generate the parameters based on the cleaned signal and the interpolated signal.

5. The apparatus of claim 1 further comprising the circuit further configured to perform the interpolation of the first signal to generate the interpolated signal using interpolation coefficients stored in a look up table.

6. The apparatus of claim 1, further comprising the first source corresponding to the second signal being a track of interest of a hard drive media with a first channel bit density and the second source corresponding to the first signal being an adjacent track to the track of interest with a second channel bit density.

7. The apparatus of claim 1 further comprising the circuit configured to:
  generate the interpolated signal as an approximation of the first signal resampled at the second rate.

8. The apparatus of claim 1 further comprising the circuit configured to:
  receive a third signal with the first rate;
  interpolate the third signal to generate another interpolated signal with the second rate;
  determine another interference component signal based on the other interpolated signal; and cancel additional interference in the cleaned signal using the other interference component signal to generate another cleaned signal.

9. The apparatus of claim 1 further comprising:
the first source corresponding to the second signal being a track of interest of a hard drive media with a first channel bit density and read by a first read head; and
the second source corresponding to the first signal being an adjacent track to the track of interest with the second channel bit density and read by a second read head.

10. A system comprising:
an interpolator circuit configured to receive a first signal with a first rate and to generate an interpolated signal with a second rate;
a cancellation circuit configured to determine an interference component signal based on the interpolated signal; and
an adder configured to receive a second signal with the second rate and to cancel interference in the second signal using the interference component signal to generate a cleaned signal;
the second signal corresponding to a first source with a first channel bit density; and
the first signal corresponding to a second source with a second channel bit density.

11. The system of claim 10 further comprising:
an equalizer circuit configured to receive a third signal with the second rate and to equalize the third signal to generate the second signal.

12. The system of claim 11 further comprising:
a detector circuit configured to generate a bit sequence based on the cleaned signal.

13. The system of claim 12 further comprising the cancellation circuit configured to determine the interference component signal based on parameters; and
a LMS circuit configured to generate updated parameters based on the cleaned signal and the interpolated signal.

14. The system of claim 13 further comprising:
the interpolator circuit further configured to perform the interpolation of the first signal to generate the interpolated signal using interpolation coefficients stored in a look up table.

15. The system of claim 14 further comprising:
the first source corresponding to the second signal being a track of interest of a hard drive media with the first channel bit density; and
the second source corresponding to the first signal being an adjacent track to the track of interest with the second channel bit density.

16. The system of claim 13 further comprising:
the interpolator circuit further configured to perform the interpolation of the first signal to generate the interpolated signal as an approximation of the first signal resampled at the second rate.

17. The system of claim 10 further comprising:
an interpolator circuit further configured to receive a third signal with the first rate and to generate another interpolated signal with the second rate;
a cancellation circuit further configured to determine another interference component signal based on the other interpolated signal;
a cancellation circuit further configured cancel additional interference in the cleaned signal using the other interference component signal to generate another cleaned signal; and
a detector circuit configured to generate a bit sequence based on the other cleaned signal.

18. A method comprising:
receiving a first signal with a first rate;
interpolating the first signal to generate an interpolated signal with a second rate;
one of:
  determining a first interference component signal based on the interpolated signal and canceling interference in a second signal using the first interference component signal to generate a first cleaned signal; and
  determining a second interference component signal based on the second signal and canceling interference in the interpolated signal using the second interference component signal to generate a second cleaned signal;
the second signal corresponding to a first source with a first channel bit density; and
the first signal corresponding to a second source with a second channel bit density.

19. The method of claim 18 further comprising:
receiving a third signal with the first rate;
interpolating the third signal to generate another interpolated signal with the second rate;
determining another interference component signal based on the other interpolated signal; and
cancelling additional interference in the first cleaned signal using the other interference component signal to generate another cleaned signal;
generating a bit sequence based on the other cleaned signal.

20. The method of claim 19 further comprising:
interpolating the second cleaned signal to generate another interpolated signal with the first rate.

* * * * *